US008887086B2

(12) United States Patent
Bos et al.

(10) Patent No.: US 8,887,086 B2
(45) Date of Patent: Nov. 11, 2014

(54) PORTABLE ELECTRONIC DEVICE AND METHOD OF CONTROLLING SAME

(75) Inventors: Jeffrey Charles Bos, Waterloo (CA); Kem-Laurin Kramer, Guelph (CA)

(73) Assignee: BlackBerry Limited, Waterloo (CA)

( * ) Notice: Subject to any disclaimer, the term of this patent is extended or adjusted under 35 U.S.C. 154(b) by 298 days.

(21) Appl. No.: 12/762,999

(22) Filed: Apr. 19, 2010

(65) Prior Publication Data

US 2011/0258576 A1     Oct. 20, 2011

(51) Int. Cl.
*G06F 3/048* (2013.01)
*G09G 5/00* (2006.01)
*G06F 3/0485* (2013.01)
*G06F 3/0488* (2013.01)

(52) U.S. Cl.
CPC .............. *G06F 3/0485* (2013.01); *G06F 3/048* (2013.01); *G06F 3/0488* (2013.01)
USPC .............................. 715/786; 345/156; 345/786

(58) Field of Classification Search
None
See application file for complete search history.

(56) References Cited

U.S. PATENT DOCUMENTS

| 6,281,881 | B1 | 8/2001 | Siddiqui et al. | |
| 6,366,302 | B1* | 4/2002 | Crosby et al. | 715/786 |
| 6,570,594 | B1* | 5/2003 | Wagner | 715/786 |
| 7,408,538 | B2 | 8/2008 | Hinckley et al. | |
| 7,786,975 | B2* | 8/2010 | Ording et al. | 345/156 |
| 2003/0122787 | A1 | 7/2003 | Zimmerman et al. | |
| 2006/0038796 | A1* | 2/2006 | Hinckley et al. | 345/173 |
| 2007/0136753 | A1* | 6/2007 | Bovenschulte et al. | 725/46 |
| 2009/0002324 | A1* | 1/2009 | Harbeson et al. | 345/173 |
| 2009/0024314 | A1 | 1/2009 | Kim | |
| 2010/0309125 | A1* | 12/2010 | Sellers et al. | 345/161 |

FOREIGN PATENT DOCUMENTS

| EP | 0 880 091 A2 | 11/1998 |
| EP | 0 880 091 A3 | 3/2000 |
| EP | 1 953 628 A1 | 8/2008 |
| EP | 2 175 353 A1 | 4/2010 |

OTHER PUBLICATIONS

R. Cowart, B. Knittel: "Using Microsoft® Windows® Vista", Dec. 26, 2006, Que, XP002602192, ISBN: 978-0-7897-3472-3, "Auto Scrolling with a Three-Button Mouse, p. 928".
Extended European Search Report dated Oct. 11, 2010, issued from the corresponding European patent application.
http://eprints.ecs.soton.ac.uk/9247/3/smith_ scrhraefelUIST04radialScroll.pdf, published at least as early as Dec. 2009.
http://www.moscovich.net/tomer/papers/scrollring04.pdf, published at least as early as Dec. 2009.
http://www-ui.is.s.u-tokyo.ac.jp/~kobayash/publications/morewheel_uist_06.pdf, published at least as early as Dec. 2009.
Office Action dated Jan. 17, 2013, issued from the corresponding CA patent application No. 2,735,040.

* cited by examiner

*Primary Examiner* — Matt Kim
*Assistant Examiner* — Tuan S Nguyen
(74) *Attorney, Agent, or Firm* — Geoffrey deKleine; Borden Ladner Gervais LLP

(57) ABSTRACT

A method includes displaying information on a touch-sensitive display of a portable electronic device, rendering a continuous scroll indicator in response to receipt of a continuous scroll input at the portable electronic device, detecting, on the touch-sensitive display, a touch associated with the continuous scroll indicator, and scrolling the information based on a direction of the change, when a change in touch location is determined.

17 Claims, 5 Drawing Sheets

PORTABLE ELECTRONIC DEVICE AND METHOD OF CONTROLLING SAME

FIELD OF TECHNOLOGY

The present disclosure relates to portable electronic devices including touch-sensitive displays and the control of such portable electronic devices.

BACKGROUND

Electronic devices, including portable electronic devices, have gained widespread use and may provide a variety of functions including, for example, telephonic, electronic messaging and other personal information manager (PIM) application functions. Portable electronic devices include, for example, several types of mobile stations such as simple cellular telephones, smart telephones, wireless personal digital assistants (PDAs), and laptop computers with wireless 802.11 or Bluetooth capabilities.

Portable electronic devices such as PDAs or smart telephones are generally intended for handheld use and ease of portability. Smaller devices are generally desirable for portability. A touch-sensitive display, also known as a touch-screen display, is particularly useful on handheld devices, which are small and have limited space for user input and output. The information displayed on the touch-sensitive displays may be modified depending on the functions and operations being performed. With continued demand for decreased size of portable electronic devices, touch-sensitive displays continue to decrease in size.

Improvements in electronic devices with touch-sensitive displays are desirable.

BRIEF DESCRIPTION OF THE DRAWINGS

Embodiments of the present disclosure will now be described, by way of example only, with reference to the attached figures, wherein.

DETAILED DESCRIPTION

Figure 1:
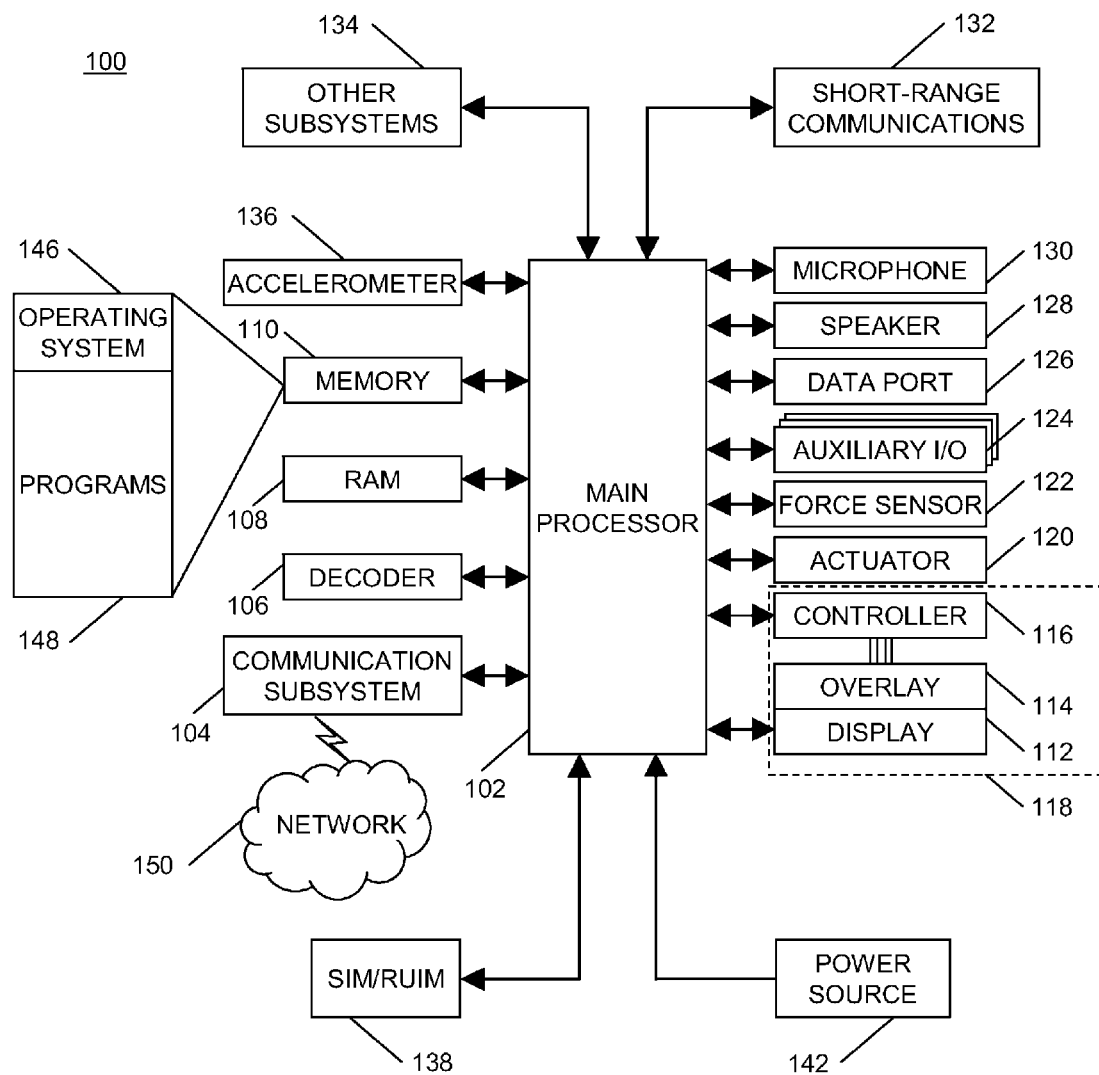
FIG. 1 is a simplified block diagram of one example of a portable electronic device in accordance with the present disclosure.

The following describes an apparatus for and method of scrolling that includes displaying information on a touch-sensitive display of a portable electronic device. A continuous scroll indicator is rendered in response to receipt of a continuous scroll input at the portable electronic device. A touch associated with the continuous scroll indicator is detected on the touch-sensitive display, and the information is scrolled based on a direction of the change, when a change in touch location is determined.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The disclosure generally relates to an electronic device, which is a portable electronic device in the embodiments described herein. Examples of portable electronic devices include mobile, or handheld, wireless communication devices such as pagers, cellular phones, cellular smartphones, wireless organizers, personal digital assistants, wirelessly enabled notebook computers, and so forth. The portable electronic device may also be a portable electronic device without wireless communication capabilities, such as a handheld electronic game device, digital photograph album, digital camera, or other device.

A block diagram of an example of a portable electronic device 100 is shown in FIG. 1. The portable electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device 100.

The processor 102 interacts with other components, such as Random Access Memory (RAM) 108, memory 110, a display 112 with a touch-sensitive overlay 114 operably connected to an electronic controller 116 that together comprise a touch-sensitive display 118, an auxiliary input/output (I/O) subsystem 124, a data port 126, a speaker 128, a microphone 130, short-range communications 132, and other device subsystems 134. The processor 102 may optionally interact with one or more actuators 120 and one or more force sensors 122. Interaction with a graphical user interface is performed through the touch-sensitive overlay 114. The processor 102 interacts with the touch-sensitive overlay 114 via the electronic controller 116. Information, such as text, characters, symbols, images, icons, and other items that may be displayed or rendered on a portable electronic device, is displayed on the touch-sensitive display 118 via the processor 102. The processor 102 may interact with an accelerometer 136 that may be utilized to detect direction of gravitational forces or gravity-induced reaction forces.

To identify a subscriber for network access, the portable electronic device 100 uses a Subscriber Identity Module or a Removable User Identity Module (SIM/RUIM) card 138 for communication with a network, such as the wireless network 150. Alternatively, user identification information may be programmed into memory 110.

The portable electronic device 100 includes an operating system 146 and software programs or components 148 that are executed by the processor 102 and are typically stored in a persistent, updatable store such as the memory 110. Additional applications or programs may be loaded onto the portable electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. A capacitive touch-sensitive display includes a capacitive touch-sensitive overlay 114. The overlay 114 may be an assembly of multiple layers in a stack including, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

One or more touches, also known as touch contacts or touch events, may be detected by the touch-sensitive display 118. The processor 102 may determine attributes of the touch, including a location of a touch. Touch location data may include an area of contact or a single point of contact, such as a point at or near a center of the area of contact. The location of a detected touch may include x and y components, e.g., horizontal and vertical components, respectively, with respect to one's view of the touch-sensitive display 118. For example, the x location component may be determined by a signal generated from one touch sensor, and the y location component may be determined by a signal generated from another touch sensor. A signal is provided to the controller 116 in response to detection of a touch. A touch may be detected from any suitable object, such as a finger, thumb, appendage, or other items, for example, a stylus, pen, or other pointer, depending on the nature of the touch-sensitive display 118. Multiple simultaneous touches may be detected.

The optional actuator 120 may be depressed by applying sufficient force to the touch-sensitive display 118 to overcome the actuation force of the actuator 120. The actuator 120 may be actuated by pressing anywhere on the touch-sensitive display 118. The actuator 120 may provide input to the processor 102 when actuated. Actuation of the actuator 120 may result in provision of tactile feedback.

A mechanical dome switch actuator may be utilized. In this example, tactile feedback is provided when the dome collapses due to imparted force and when the dome returns to the rest position after release of the switch.

Alternatively, the actuator 120 may comprise one or more piezoelectric (piezo) actuators that provide tactile feedback for the touch-sensitive display 118. Contraction of the piezo actuator(s) applies a spring-like force, for example, opposing a force externally applied to the touch-sensitive display 118. Each piezo actuator includes a piezoelectric device, such as a piezoelectric disk, adhered to a substrate such as a metal substrate. The substrate bends when the piezoelectric device contracts due to build up of charge/voltage at the piezoelectric device or in response to a force, such as an external force applied to the touch-sensitive display 118. The charge/voltage may be adjusted by varying the applied voltage or current, thereby controlling the force applied by the piezo actuators. The charge/voltage at the piezo actuator may be removed by a controlled discharge current that causes the piezoelectric device to expand, decreasing the force applied by the piezo actuators. The charge/voltage may be removed over a relatively short period of time to provide tactile feedback to the user. Absent an external force and absent a charge/voltage at the piezo actuator, the piezo actuator may be slightly bent due to a mechanical preload.

Figure 2:
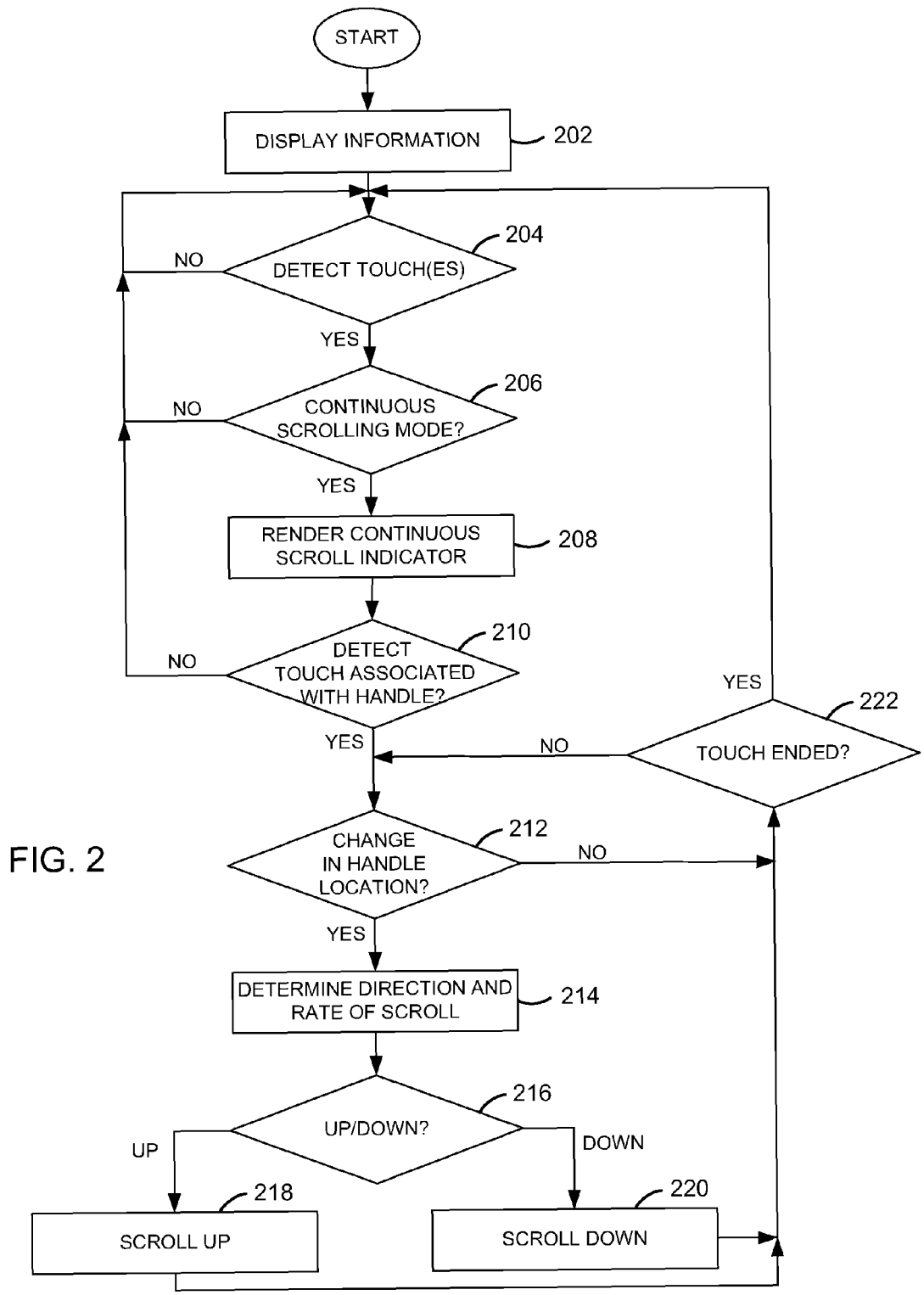
FIG. 2 is a flowchart illustrating an example of a method of scrolling displayed information on a portable electronic device in accordance with the present disclosure.

FIG. 2 is a flowchart illustrating an example of a method of scrolling information. The method may be carried out by software executed by, for example, the processor 102. Coding of software for carrying out such a method is within the scope of a person of ordinary skill in the art given the present description. The method may contain additional or fewer processes than shown and described, and may be performed in a different order. Computer-readable code executable by, for example, the processor 102 of the portable electronic device to perform the method, may be stored in a computer-readable medium.

Information is displayed on the touch-sensitive display 118 of the portable electronic device 100 at 202. The information may be any suitable information from or stored in association with an application, including, for example, text such as text of an email, a webpage downloaded to the portable electronic device 100, a list such as a list of emails, calendar events, tasks or any other suitable list, or any other suitable information. Because the touch-sensitive display 118 on a portable electronic device 100 is typically relatively small, the amount of information displayed is typically much less than the amount of information that may be displayed, for example, on a computer monitor or other larger device. Information from an application, based on the screen size and memory capability of the device controlling the display of information on the screen, is available to be displayed by scrolling. The amount of information is often more than fits on the touch-sensitive display 112 at one time When a touch or touches are detected on the touch-sensitive display at 204, a determination is made whether or not the touch or touches that are received are input enter a continuous scroll mode at 206, also referred to herein as continuous scroll mode touches. Touches that cause the portable electronic device 100 to enter the continuous scroll mode may be any predetermined touch or touches. For example, a specific gesture on the touch-sensitive display or a tap sequence may cause the portable electronic device 100 to enter the continuous scroll mode. A gesture includes any touch, the location of which changes with time such that the touch begins at an origin and moves over a period of time. A tap includes a touch of very short duration. When the touch or touches are continuous scroll mode touches, the process continues at 208. Otherwise, the process returns to 204.

When the touches are continuous scroll mode touches, the portable electronic device enters a continuous scroll mode and a continuous scroll indicator is rendered on the touch-sensitive display 118 at 208. The continuous scroll indicator may be any suitable indicator to indicate that the portable electronic device has entered the continuous scroll mode, and includes a handle that is moveable on the touch-sensitive display 118 for scrolling. The handle is any suitable feature and is moved by touching on an area of the touch-sensitive display 118 that is associated with the handle, also referred to as grabbing, and moving the touch location, also referred to as dragging. The area associated with the handle may correspond with the area at which the handle is rendered on the touch-sensitive display 118 and may include an additional, surrounding area to facilitate grabbing the handle and dragging the handle.

When a touch is detected at a location that is associated with the handle at 210, the process continues at 212 where a determination is made whether or not the touch location changes at 212. When a touch is not detected at a location that is associated with the handle, the process returns to 204. Thus, when a touch is received at a location on the touch-sensitive display 118 that is not associated with the handle, the portable electronic device 100 exits the continuous scroll mode and returns to 204. Alternatively, when a touch is not received within a predetermined period of time after entering the continuous scroll mode, the portable electronic device 100 may exit the continuous scroll mode and return to 204. In this example, when a change in touch location is not detected at 212, the process continues at 222, where a determination is made whether or not the touch has ended. When the touch has ended at 222, the process continues at 204. The processor 102 therefore awaits detection of a change in touch location or an end of the touch.

When a change in touch location is detected at 212 the process continues at 214. The direction of scrolling is determined at 214 based on the direction of change of location of the handle, from the original location of the handle to the new location of the handle. The direction of the line along the shortest path from the original location of the handle to the new location of the handle determines the direction of scrolling and the distance of the line, which is the shortest distance from the original location of the handle to the new location of the handle, determines the rate of scrolling at 214. A greater distance results in a greater rate of scrolling.

A determination is made at 216, whether the scrolling is in the upward direction or the downward direction relative to the orientation in which the information is displayed. When the direction is up, the information is scrolled up at 218 at the rate of scrolling determined at 214. When the direction is down, the information is scrolled down at 220, at the rate of scrolling determined at 214.

The process continues at 222 where a determination is made whether or not the touch has ended. When the touch continues, the process of determining the change in location, the direction and rate of scroll, and scrolling continues. Thus, the rate of scrolling may be adjusted during scrolling when a further change in location is detected. The direction of scrolling may also be changed while in the continuous scroll mode.

Figure 3:
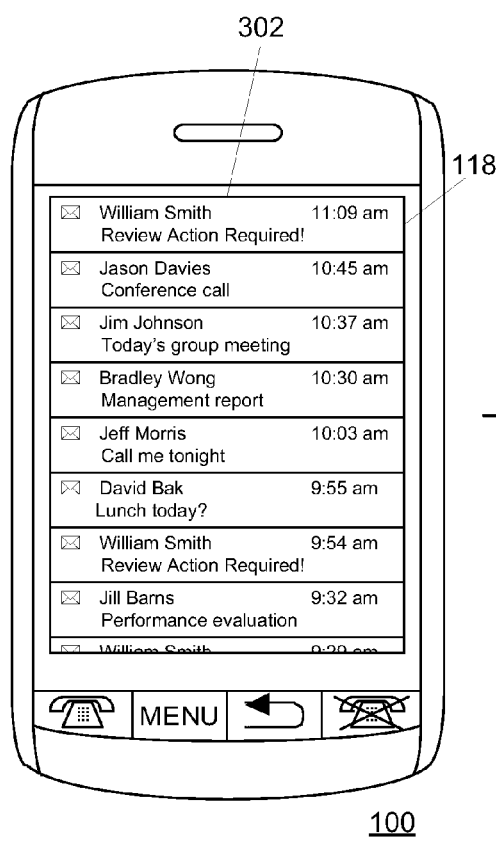
FIG. 3 through FIG. 6 illustrate examples of a portable electronic device in the example method of scrolling of FIG. 2.

Referring now to FIG. 3 through FIG. 6, examples of a portable electronic device in a method of scrolling are shown. As shown in FIG. 3, information is displayed on the display 112 at 202. In the example shown, a list of email messages 302 received at the portable electronic device 100 are shown. The number of email messages received at the portable electronic device is greater than can be displayed on the display 112 at any one time. Scrolling is utilized in the present example to navigate through the email list.

For the purpose of the present example, two taps, that are detected within a maximum predetermined period of time, on the touch-sensitive display 118 are utilized to enter the continuous scroll mode. When the input in the form of touches, which in this example are taps on the touch-sensitive display, is detected at 204, a determination is made at 206 that the input is a continuous scroll mode input at 206.

Figure 4:
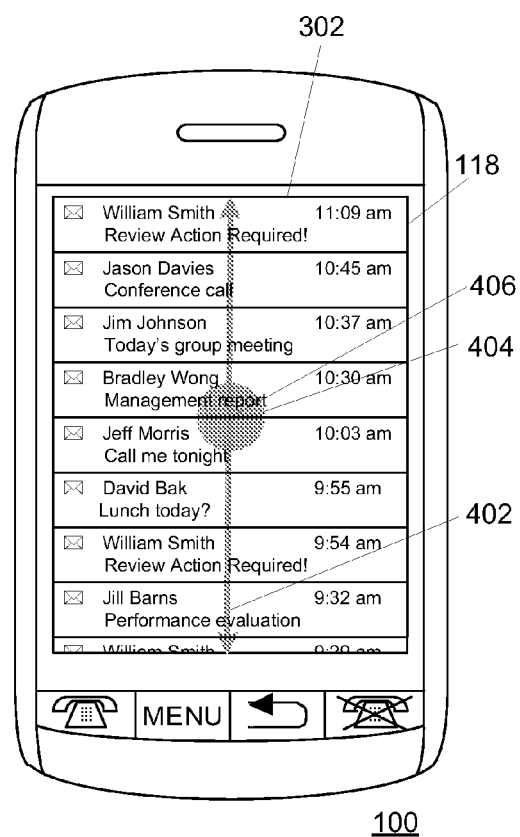

The portable electronic device 100 enters the continuous scroll mode and a continuous scroll mode indicator is rendered on the touch-sensitive display 118 at 208, as shown in FIG. 4. The continuous scroll mode indicator in the present example includes a vertical, double-ended arrow 402 and a handle 404. The handle 404 is a large circular handle 404 rendered at a location 406 in the center of the double-ended arrow 402. The attributes of the arrow 402 and the handle 404 may facilitate viewing the email list 302. In the present example, the arrow 402 and handle 404 are rendered such that the information in the email list 302 is visible through the arrow 402 and handle 404.

Another touch is detected, beginning at a location on the touch-sensitive display 118 that is associated with the handle 404 at 210. In the example shown in FIG. 5, the touch is generally centered on the handle 404. The touch, however, may begin at an off-centered location or adjacent the handle 404, for example.

Figures 5, 6:
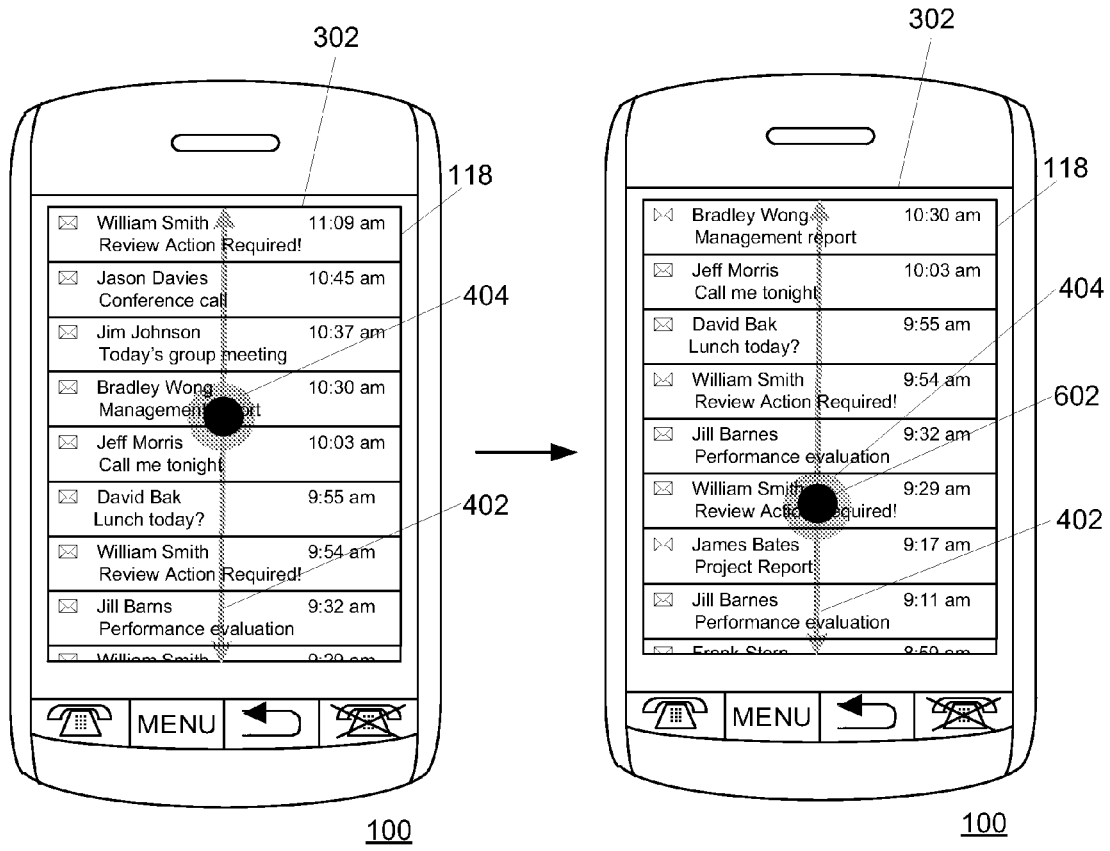

A change in location of the touch is detected and the handle 404 is moved with the touch to the location 602. The direction of change of location of the handle 404 is determined at 214. The direction is determined based on the direction from the original location 406 of the handle 404 rendered at 208, and shown in FIG. 4, to the new location 602 of the handle 404, and the rate of scrolling is determined based on the shortest distance from the location 404, as shown in FIG. 4, to the location 602, as shown in FIG. 6. The direction is downward at 216 and the emails in the list 302 are scrolled downwardly at 220, thereby scrolling to older emails in the list. As long as the touch is maintained, scrolling continues to the end of the list of email 302. The touch described herein may also be referred to as a drag gesture as the touch begins at an origin and is moved to a new location to effectively drag the handle to a new location.

Figure 7:
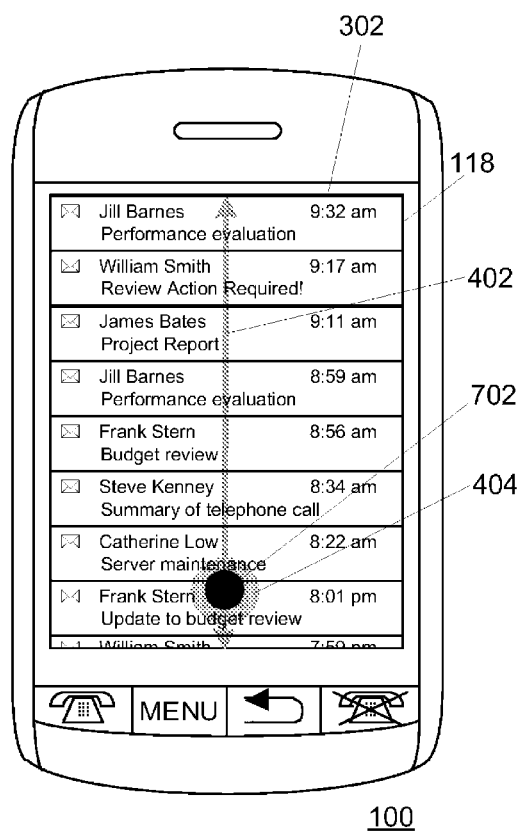
FIG. 7 illustrates another example of the portable electronic device in the example method of scrolling of FIG. 2.

As indicated, the rate of scrolling is determined based on the shortest distance from the original location of the handle to the new location of the handle. In the example of FIG. 7, the handle 404 is moved to a location 702 that is a greater distance from the original location 406 than the distance of the location 602, shown in FIG. 6, from the original location. The rate of scrolling is therefore greater in the example of FIG. 7 than in the example of FIG. 6.

Figure 8:
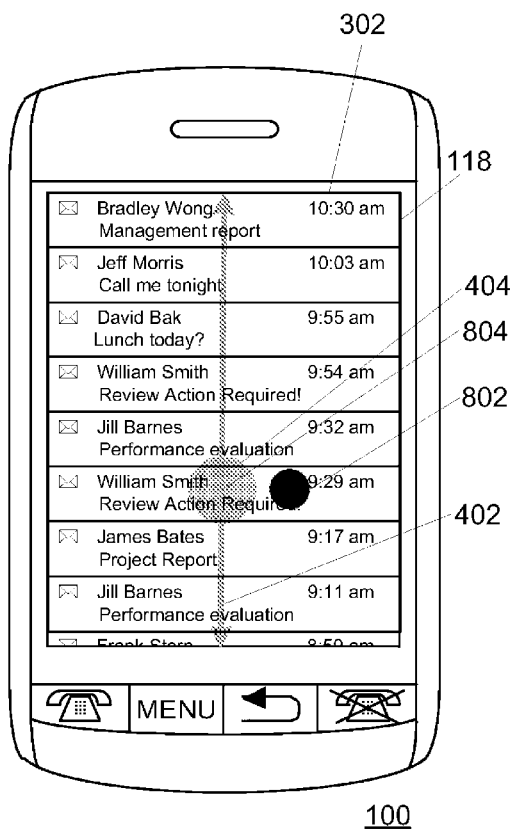
FIG. 8 illustrates another example of a portable electronic device in the example method of scrolling of FIG. 2.

In the examples of FIG. 6 and FIG. 7, the touch moves generally vertically along the arrow 402. The touch may, however, move at an angle relative to the arrow 402. For the purpose of the example of FIG. 8, the touch has moved from the original location shown in FIG. 4 to a new location 802 to the right of the arrow 402 in the orientation in which the list 302 is displayed. The vertical component of the direction of change of the touch location is determined and the handle 404 is moved to the location 804 along the arrow 402, by the same distance as the vertical component of the change in location of the touch. The direction and the rate of scrolling are determined and scrolling begins.

In the flowchart and the examples described above, scrolling ends when the touch ends. In other embodiments, a further touch may be utilized to move the handle to yet another location to change the scrolling direction or the scrolling rate or both the scrolling direction and the scrolling rate. Thus, rather than returning to 204 if the touch has ended at 222, the processor 102 may await detection of input to exit the continuous scroll mode, such as a further specific gesture, tap or sequence of taps. When the input to exit the continuous scroll mode is received, the process returns to 204. When input to exit the continuous scroll mode is not received, the process may return to 210 to await a further touch.

According to another alternative example, scrolling may continue based on the location of the handle when the touch ends. Optionally, a further gesture, touch, or tap sequence may be utilized to lock scrolling at a constant scroll rate after the touch ends.

The control of the portable electronic device for scrolling facilitates interaction and selection, for example, of information displayed, such as an email in a list, for viewing details such as the body of the email. An input is utilized to switch to a continuous scroll mode to facilitate scrolling through the information. When in the continuous scroll mode, scrolling may be effected and adjusted to a suitable direction and scrolling rate. The scrolling may continue without repetitive swipes or other gestures, for example. Both direction and speed may be determined based on the origin of the drag gesture and distance, without requiring any further button, menu or other more time-consuming selection method. Information may be scrolled through more quickly, thereby decreasing power requirements and increasing battery life.

According to one aspect, a method is provided. The method includes displaying information on a touch-sensitive display of a portable electronic device, rendering a continuous scroll indicator in response to receipt of a continuous scroll input at the portable electronic device, detecting, on the touch-sensitive display, a touch associated with the continuous scroll indicator, and scrolling the information based on a direction of the change, when a change in touch location is determined.

According to another aspect, a computer-readable medium has computer-readable code embodied therein that is executable by at least one processor of a portable electronic device to perform the above method.

According to another aspect, a portable electronic device includes a touch-sensitive display configured to display information, and a processor connected to the touch-sensitive display to render a continuous scroll indicator in response to receipt of a continuous scroll input at the portable electronic device, detect, on the touch-sensitive display, a touch associated with the continuous scroll indicator, and scroll the information based on a direction of the change, when a change in touch location is determined.

The present disclosure may be embodied in other specific forms without departing from its spirit or essential characteristics. The described embodiments are to be considered in all respects only as illustrative and not restrictive. The scope of the present disclosure is, therefore, indicated by the appended claims rather than by the foregoing description. All changes that come within the meaning and range of equivalency of the claims are to be embraced within their scope.

What is claimed is:

1. A method comprising:
   displaying information on a touch-sensitive display of a portable electronic device;
   receiving a continuous scroll input to enter a continuous scroll mode, the continuous scroll input comprising a first touch on the touch-sensitive display;
   rendering a continuous scroll indicator in response to receipt of the first touch at the portable electronic device;
   when a second touch is detected, within a threshold period of time, on the continuous scroll indicator rendered in response to receipt of the first touch, and a change in touch location of the second touch is determined, scrolling the information based on a direction of the change; and
   when a second touch is not detected within a threshold period of time, exiting the continuous scroll mode and discontinuing display of the continuous scroll indicator.

2. The method according to claim 1, comprising determining a distance of the change, and wherein scrolling comprises scrolling at a rate based on the distance of change.

3. The method according to claim 1, wherein the continuous scroll indicator comprises a scroll handle.

4. The method according to claim 3, wherein detecting a second touch on the continuous scroll indicator comprises detecting a second touch on the scroll handle.

5. The method according to claim 4, comprising changing a location of the scroll handle with the change in touch location of the second touch.

6. The method according to claim 5, comprising determining a distance of change in location of the scroll handle, and wherein scrolling comprises scrolling at a rate based on the distance of change.

7. The method according to claim 4, wherein detecting a second touch on the handle comprises detecting a second touch at a location that is within an area surrounding the handle.

8. The method according to claim 1, comprising determining a component of the direction of change, and wherein scrolling comprises scrolling based on the direction of the component.

9. The method according to claim 8, wherein determining a component comprises determining a vertical component relative to the orientation in which the information is rendered.

10. The method according to claim 1, comprising determining one of an up direction and a down direction relative to the orientation in which the information is rendered.

11. The method according to claim 1, comprising exiting the scroll mode when the second touch ends.

12. The method according to claim 1, wherein the first touch comprises a double tap input detected on the touch-sensitive display.

13. The method according to claim 1, comprising continuing scrolling until the second touch ends.

14. The method according to claim 1, wherein detecting a second touch on the continuous scroll indicator comprises detecting a second touch at a location that is within an area surrounding the continuous scroll indicator.

15. A non-transitory computer-readable storage device having computer-readable code executable by at least one processor of the portable electronic device to perform the method of claim 1.

16. A portable electronic device comprising:
   a touch-sensitive display configured to display information; and
   a processor connected to the touch-sensitive display to:
      receive a continuous scroll input to enter a continuous scroll mode, the continuous scroll input comprising a first touch on the touch-sensitive display;
      render a continuous scroll indicator in response to receipt of the first touch at the portable electronic device;
      when a second touch is detected, within a threshold period of time, on the continuous scroll indicator rendered in response to receipt of the first touch, and a change in touch location of the second touch is determined, scroll the information based on a direction of the change; and
      when a second touch is not detected within a threshold period of time, exit the continuous scroll mode and discontinue display of the continuous scroll indicator.

17. A method comprising:
   displaying information on a touch-sensitive display of a portable electronic device;
   receiving a continuous scroll input to enter a continuous scroll mode, the continuous scroll input comprising a first touch on the touch-sensitive display;

rendering a continuous scroll indicator having a scroll handle in response to receipt of the first touch at the portable electronic device;

when a second touch, is detected, within a threshold period of time, on the scroll handle of the continuous scroll indicator rendered in response to receipt of the first touch, and a change in touch location of the second touch is determined, scrolling the information in a direction based on a direction of the change and at a rate based on a distance of the change; and when a second touch is not detected within a threshold period of time, exiting the continuous scroll mode and discontinuing display of the continuous scroll indicator.

* * * * *